United States Patent [19]

Ross et al.

[11] 4,336,274
[45] Jun. 22, 1982

[54] WHOLE BLUE CRAB FREEZING PROCESS

[76] Inventors: Kenneth B. Ross, Bel Air; Carl R. Jones, Takoma Park, both of Md.

[21] Appl. No.: 173,690

[22] Filed: Jul. 30, 1980

Related U.S. Application Data

[63] Continuation-in-part of Ser. No. 27,659, Apr. 6, 1979, abandoned, which is a continuation-in-part of Ser. No. 768,229, Feb. 14, 1977, abandoned.

[51] Int. Cl.³ .............................. A23B 4/08; A23L 1/33
[52] U.S. Cl. .......................................... 426/643; 62/64; 62/65; 426/393; 426/418; 426/509; 426/524; 426/652; 426/654; 426/658
[58] Field of Search ............... 426/129, 323, 324, 327, 426/332, 541, 546, 643, 652, 654, 658, 393, 410, 418, 506, 509, 510, 523, 524, 442; 62/60, 62, 63, 64, 65

[56] References Cited

U.S. PATENT DOCUMENTS

| | | | |
|---|---|---|---|
| 2,488,184 | 11/1949 | Garnatz et al. | 426/643 |
| 2,501,655 | 3/1950 | Altenburg | 426/506 |
| 2,600,627 | 6/1952 | Envoldsen | 426/509 X |
| 2,616,811 | 11/1952 | Kjorstad | 426/643 X |
| 2,758,930 | 8/1956 | Toulmin | 426/643 X |
| 2,954,298 | 9/1960 | Anderson et al. | 426/643 X |
| 3,022,175 | 2/1962 | Wakefield | 426/393 X |
| 3,297,454 | 1/1967 | Webster et al. | 426/524 X |
| 3,692,545 | 9/1972 | Moore | 426/643 X |

OTHER PUBLICATIONS

Ampola et al., "A New Approach to the Freezing Preservation of Blue Crab", National Marine Fisheries Service, pp. 243–248.

Strasser, "Blue Crab Meat Preservation by Freezing", Annual Meeting of Institute of Food Technologists, 5-1970, pp. 1–13.

Borgstrom, *Fish as Food*, vol. IV, pp. 308–309, 1965, p. 170.

Morgan, Technical Report No. KSS-7700, Freon Production Div., E. I. du Pont Co., 8-13-74.

Plumline et al., "Freon Freezing of Live Blue Crabs", Freon Products Laboratory, E. I. du Pont Technical Report, KSS-7772, 1-31-75.

*Primary Examiner*—Arthur L. Corbin
*Attorney, Agent, or Firm*—Gordon C. Fell

[57] ABSTRACT

An improved quick-freezing process for whole blue crabs to be subsequently served whole as steamed crabs with enhanced flavor and providing extended shelf life without loss of flavor or texture. The process includes the steps of quick cooking whole blue crabs while maintaining maximum water content using a sugar-liquid bath, chilling while maintaining maximum water content using a sugar-liquid bath and quick freezing to at least −15° F. without cracking, and storage at a uniform temperature of at least −15° F.

9 Claims, 1 Drawing Figure

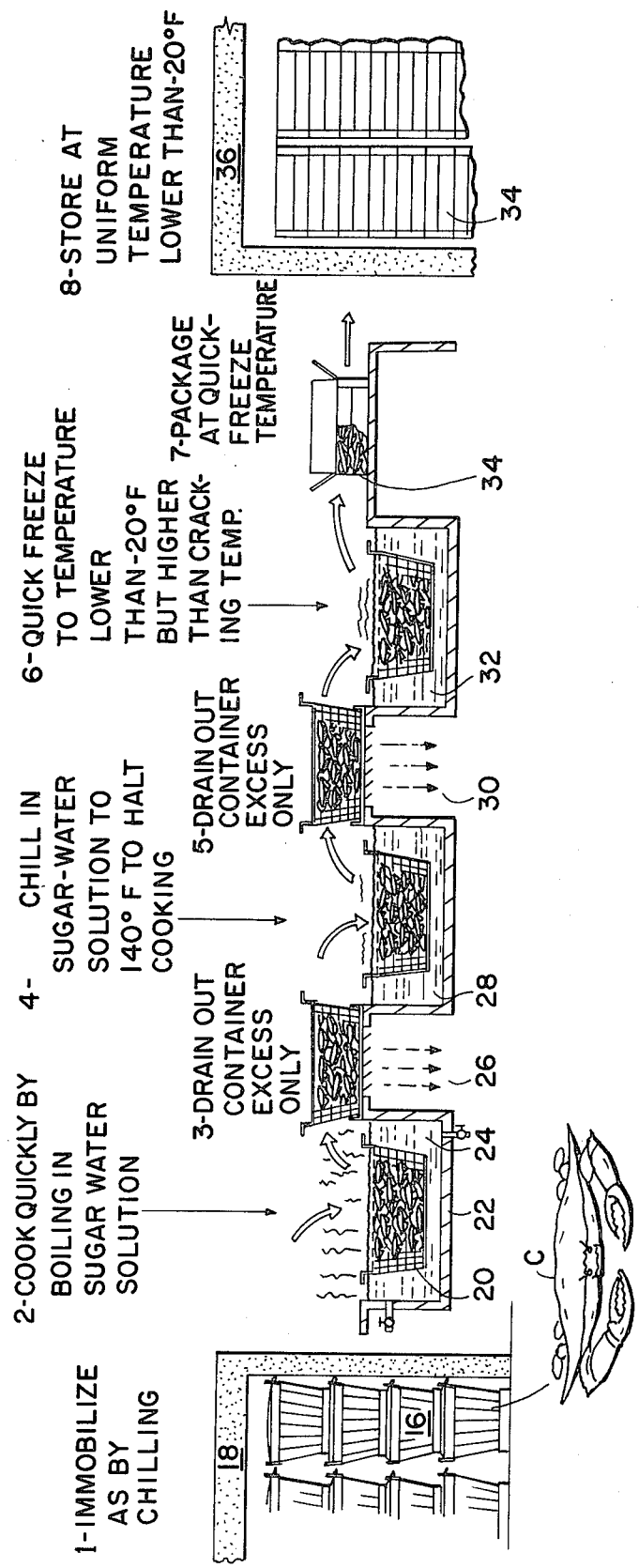

WHOLE BLUE CRAB FREEZING PROCESS

BACKGROUND OF THE INVENTION

This application comprises a continuation-in-part of our copending application Ser. No. 027,659, for WHOLE IN-SHELL CRAB FREEZING PROCESS, filed Apr. 6, 1979, now abandoned which is a continuation-in-part of Ser. No. 768,229, filed Feb. 14, 1977, now abandoned.

In the prior art numerous quick-freeze process disclosures appear, including the following U.S. Pat. Nos.:

3,692,545 to R. Moore, 9-19-72;
3,297,454 to R. C. Webster et al, 1-10-67;
3,022,175 to L. A. Wakefield, 2-20-62;
2,600,627 to K. C. Envoldsen, 6-17-52;
2,501,655 to W. M. Altenberg, 3-29-50.

As can be seen on examining these patents, they disclose as follows:

Moore discloses the sequential steps of processing seafood by: boiling, pre-chilling, freezing and storing frozen.

Webster and Benson disclose processing food in the sequential steps: pre-freezing preparation, pre-chilling and liquified gas immersion freezing for storing frozen.

Wakefield discloses processing shrimp by applying a brine and sugar solution, suggesting a salinity of at least 20° salinometer in the combination (see Col. 2 and claim 5); cooking at less than boiling temperature is also suggested as part of the process.

Sugar is evidently to be added as seasoning (Col. 2, lines 29-32 and claim 6, for example) and evidently in negligble amount because only salt is disclosed as increasing the boiling point. (Col. 2). Cooling in a brine sugar bath is suggested. However, coaction of a brine and sugar solution in quick freeze preservation even of shrimp is not taught, much less the salt-free process of this invention.

Also having pertinence to food preservation is the following publication: Ampola et al "A New Approach To The Freezing Preservation Of Blue Crab", National Marine Fisheries Service, pages 243-247, which discusses quick-freeze preservation of body sections of cooked blue crabs.

However, in constrast with the present invention, this publication discloses in relation to cooking and quick freezing crabs that:

1. "Almost no crabmeat is sold as a frozen pack since the traditional freezing process and storage causes the meat to lose its delicate crab flavor, and in time it usually becomes tough, discolored and watery. It is obvious that the industry would profit greatly if an effective method could be found to freeze the product without adverse quality losses";

2. Storing of quick frozen picked crabmeat is known.

3. "Additional work using additives in efforts to retard the detrimental effects of freezing were of no consequence since our taste panelists always detected the presence of these substances. Taste test scores were consistently better on quick frozen meat that had not been treated with additives";

4. "In our contacts with the industry, we were told of some attempts to freeze whole crabs for the purpose of controlling the supply cycle during the year. In all cases these attempts resulted in poor quality products, and since whole crabs only yield 15% meat, the freezing costs per pound of meat were high".

5.
   a. Meats picked from crabs that had been given the minimum cool (100° C. for 8 minutes, in contrast with 120° C. for 10 minutes) and then had been quick frozen were superior to all others;
   b. They might not pass U.S. Department of Health standards [they definitely do not meet Maryland Health Department standards]; and that
   c. This problem could be solved by first chlorinating live crabs in 220 ppm free chlorine for 30 minutes as a first step.

That the evident cruelty of the last mentioned step is as objectionable as the useless attendant expense and deterioration in quality and lack of necessity will become apparent by contrast with the description of the present invention. It is well known in the industry that a crab that has been chlorinated never loses the chlorine taste and will not be accepted by the public for that reason.

Altenberg discloses preserving seafood by boiling, cooling, rapidly freezing and storing frozen.

In addition to these some patents disclose the use of dextrose in vegetable or fruit freezing methods.

Likewise publications have described blue crab meat preservation by cooking, pre-chilling, and quick-freezing in liquified gas such as in Freon 12, and in N. In this connection, attention is directed to the following publications:

Blue Crab Meat, Preservation by Freezing, by Jurgen H. Strasser and Jean S. Lonnon, Central Engineering Laboratories, FMC Corporation, 1185 Coleman Avenue, Santa Clara, Calif. 95052 and Frederick J. King, National Marine Fisheries Service Technological Laboratory, Cloucester, Mass. 01930, presented at the 30th Annual Meeting of the Institute of Food Technologists, May 24-28, 1970. Final Report Blue Crab Meat Preservation Study, Contract No. 14-17-0007-968, Report No. R-2820, Period: June 28, 1968 to Aug. 28, 1969, Prepared for U.S. Department of the Interior Fish and Wildlife Service, Bureau of Commercial Fisheries, Washington, D.C. 20240; Freon Products Division, E.I. du Pont de Nemours and Company, Technical Report, Report Number: KSS-7700, Subject: Feasibility Study: Extruding Foods into a Liquid Freon Freezer, by J. R. Morgan, Aug. 13, 1974.

However, none of the above prior art disclosures fairly suggests or indicates an appreciation of the advantages of the present invention, expecially as set out below. Although the general freezing temperatures are elsewhere disclosed, the essential sugar treatment and moisture maintenance features do not appear in the prior art crab processes known to Applicants.

Other recent publications describe aspects of blue crab processing. In Desrosier, editor, "Elements of Food Technology", AVI Publishing Co., Westport, Connecticut, at page 396, Robert J. Learson in writing about "Blue Crab" states:

"Blue crab meat frozen by conventional means does not freeze and store well. After a few weeks of frozen storage the meat becomes fibrous, watery, and loses much of its natural flavor. For this reason only very small amounts are frozen and most of this meat is for institutional use in crab specialty products. Recent work on freezing, however, has shown that a reduced precook combined with cryogenic freezing produces a highly acceptable product through six months of storage."

However by letter dated Jan. 4, 1979, addressed to one of the present inventors, Mr. Learson states:

"The reference made to blue crab freezing on page 396 in "Elements of Food Technology" is based on our research paper "A new approach to the freezing preservation of blue crab" by Ampola, V. G. and R. J. Learson, presented at the 13th International Congresss of Refrigeration, Washington, D.C., 1971".

In another letter dated Nov. 22, 1978, addressed to the same inventor, Mr. Learson states:

"Enclosed is some information on the freezing preservation of blue crab. In general, blue crab is not amenable to common freezing techniques used for shrimp or king crab. The muscle structure is different and without special care the meat becomes fibrous and tastes fishy after just a few months of frozen storage. I am also enclosing copies of our Annual Blue Crab Report to give you an idea of our ongoing research. If you have any questions, please give me a call."

The mentioned Annual Blue Crab Report is directed to a roller process for extracting crab meat to be preserved in various ways or used fresh, and to iso-electric identification of crab species.

So suprisingly difficult has the freezing preservation of whole crabs been found in the past, even as compared with crab meat, that U.S. Government financed work which was carried on by others for several years met with such lack of success that work is understood now to have been terminated,

BRIEF DESCRIPTION OF THE INVENTION

This invention relates generally to food preservation and specifically to preservation of meat of the blue crab (Callinectes sapidus).

A sizeable portion of the public is accustomed to buying steamed crabs in the shell; whole crabs served steamed and spiced in an accustomed but presently seasonal part of their menu.

Principal objects of the invention are to provide a successful method for freezing preservation of whole blue crabs as distinguished from crab meat, including freezing preservation of whole blue crabs over a period of time long enough to span from one crab season to the next, and without loss of fresh whole blue crab flavor and texture.

A further object of the invention is to make available for the first time freeze-preserved whole blue crabs which even after months of storage are as commercially acceptable to the knowledgeable public when served as steamed crabs as are fresh whole blue crabs themselves.

A still further object of the invention is to conserve our natural resources by preventing the 10% to 20% loss through spoilage of live crabs in transit and storage, presently accepted as unavoidable but amounting to a waste of millions of dollars and millions of pounds of whole crabs destroyed each year, by enabling satisfactory whole blue crabs quick freezing at the source and shipment and storage with substantially zero loss.

Still a further object is to provide a method as described which yields a nearly sterile end-product by actual plate count, in surprising contrast with picked crab meat, for example.

And yet a further object is to make possible greater business efficiences in assuring, for example, a supply of highest quality whole crabs for steaming for large events planned months ahead, something that now is not possible.

A still further object is to provide a process applicable to other commercially harvested crabs.

Where used in this disclosure the terms pre-chilling or chilling mean sudden drop of temperature of the degree indicated, not necessarily that the material becomes cold to the touch.

In brief summary given for purposes of exposition only and not as limitation, the invention includes an improvement in known cooking, prechilling, quick freezing and low-temperature storage of whole blue crabs by use of sugar in conjunction with moisture maintenance in processing stages.

The above and other objects and advantages will become more readily apparent on examination of the drawing Figure, which is a schematic stage by stage representation of a process according to a preferred mode of the invention.

BRIEF DESCRIPTION OF THE DRAWING

The single FIGURE of the drawing comprises a schematic view of the sequential steps involving the process of the invention.

DETAILED DESCRIPTION OF THE INVENTION

In the FIGURE at the left, stage 1 of the process occurs. According to conventional practice, fresh live crabs C are immobilized by chilling or other means, as in baskets 16 in a refrigerator 18, to permit packing them in stainless steel or plastic permeable containers with lids for further processing without breakage.

In stage 2 the crabs, in the permeable containers with lids 20, are immersed for quick cooking in a vat 22 containing a boiling sugar-water solution 24 for a time just sufficient to cook or "fix" or set the meat. For standard-size crabs in an unpressurized bath this may be for 10 to 20 minutes, at approximately 212° F., the practical boiling point being somewhat elevated by the sugar content of the bath. The faster the cooking the better the end result will be. Overcooking is unnecessary and to be avoided.

Actually by the above term "fix", it is meant that the protein is denatured (a change in proteins that usually shows a very different solubility than native protein). Denaturation may be a reversal of conditions including changes in pH, heat, ultraviolet irradiation and violent agitation. This change is frequently irreversible.

Sugar content may be ⅛ pint dry measure per gallon of water, but may vary to ±50%. The solution in normal batch processing, as illustrated, should be replenished at the rate of at least 1% per minute to prevent contamination and "boiling-up" during processing.

The sugar acts as a flavor enhancer as well as a preservative and, surprisingly, reinforces natural fresh flavor of the crab rather than change it.

Salt not only does not help the flavor but also any taste-detectable amount tends to degrade the product and is to be avoided entirely according to this invention.

In stage 3 the container excess of liquid is quickly drained as at 26 to prepare for and facilitate quick-chilling. However, in this stage all of the contained water in the crab shells is not given time to drain out, but instead is retained as much as possible to maintain close semblance of natural environmental, or saturated moisture, proportion in the crabmeat. Additional viscosity provided by the sugar in solution evidently will contribute to slower internal drainage, and will, in saturating every portion of the crab, enhance the flavor of every portion equally. In a normally free-draining container with crabs closely packed to a depth of not more than one foot, only 1 to 3 minutes will be required for drainage, but in a conveyor production process the drainage time may be reduced to a few seconds.

In stage 4, immediately upon completion of the quick drain-off of excess water in the container, the crabs are quickly cooled or pre-chilled in a prefreezing bath 28, to an internal temperature of 140° or less as fast as practicable to stop the cooking, as by plunging them into a solution of chilled water such as ice water. Here they remain immersed for 5 to 10 minutes.

Importantly, the chilling bath preferably contains the same proportion of sugar as the cooking bath to prevent interchange-dilution of the in-shell liquids and to preserve flavor on the exterior also.

In stage 5 as at 30 similar quick drainage again removes the excess container water but not the in-shell liquids, in preparation for freezing. The crab interior remains filled for complete saturation and is frozen in this condition.

In stage 6 the exteriorly drained but interiorly liquid-saturated crabs are quick frozen by being plunged into a freezing bath 32, as before, completely immersing them, this time for a period necessary to reduce the internal temperature of the crabs to at least $-15°$ F. (preferably $-20°$ F. or below) as quickly as possible without cracking the shells. This may require 10 to 12 minutes depending on crab size. Slow freezing ruptures the cell structure causing mushy consistency and off-taste. A quick freeze is defined as a process in which food passes through the zone of 0° C. to $-4°$ C. in 30 minutes or less. During this period water converts to ice and is unavailable to microorganisms. However, to pass through the range of main ice crystal formation in the shortest time possible, the reduction of internal temperature to at least 28° F. is to be completed in 10 to 30 minutes.

At this stage the carefully maintained bath liquid in the crabs is believed to perform two crucial functions: 1. locking in the flavor, both inside and outside the crab, and 2. promoting heat flow producing uniform fast freezing of all parts of the crab and practically eliminating progressive freezing caused by hollows. These two factors are believed to account for the surprising improvement in texture and flavor achieved by this process as compared with prior known processes. Eliminated is any need for pre-freezing orientation of the crabs, and obviously reduced is the hazard of temperature fluctuation caused by air circulation and by conduction during packaging and storing. Contrasts with the problems in freezing picked crabmeat are clearly evident in this respect.

The freezing bath preferably is a fluorocarbon refrigeration gas, and preferably "Freon 12" thermostatted to an approximately uniform $-23°$ F. to preclude cracking the crab shells with resulting interchange and loss of fluid and marketability while dropping the temperature below $-20°$ F. Cessation of boiling indicates temperature equilibrium in this stage.

In stage 7 the frozen crabs are quickly packed, preferably in hermetically sealed packages 34, although permeable plastic packages may be used.

In stage 8 the crabs are maintained with the solution saturated interiors in freezer-storage 36 at a uniform temperature preferably lower than $-20°$ F. (at least $-15°$ F.), and in this condition will preserve the enhanced flavor imparted by this invention and true crab-texture indefinitely, it is believed. At higher storage temperatures a chemical reaction occurs which affects the taste, flavor and appearance of the product.

EXAMPLE I

Blue crabs taken commercially from South Carolina waters in early December, measuring $5\frac{1}{2}$ to $6\frac{1}{2}$ inches across, and weighing accordingly, purposely selected to include typical proportions of "mixed quality", some poor, some medium and some heavy, were promptly, upon receipt in good condition, immobilized by chilling, stacked in layers 6" high (2 or 3 crabs thick) in a openwork plastic basket, boiled by immersion for 10 to 17 minutes at substantially 212° F. in a solution of water containing $\frac{1}{8}$ pint dry measure of sugar per gallon, prechilled by immersion for 5 to 10 minutes in a sugar-water bath of the same constituency maintained at 36° to 42° F., drained for 1 to 3 minutes, and then frozen by immersion in a bath of "Freon 12" liquid gas held at $-23°$ F. until boiling stopped, promptly removed, hermetically sealed by plastic wrapping in small lots in closely packed cartons, and stored at a uniform temperature below $-20°$ F.

During the two months following freezing, periodic taste, odor and texture comparisons of the blue crabs so-processed and freshly thawed were made by experts in seafood preparation, using as standards of comparison both freshly thawed crabmeat treated similarly but without sugar and liquid-content maintenance, and freshly cooked fresh blue crab meat. In every case the conventional frozen product was found distinctly inferior in taste, odor and texture, and the product of the invention was found equal to freshly cooked fresh crab meat. Substantially more sugar than noted was found to impart a sweet taste; substantially less failed to give the desired effect; tasting was the principal criterion.

EXAMPLE II

Later similar tests extending over periods in excess of six months showed substantially no deterioration in the product and gave some indication that the flavor might actually improve.

The tests were also made using the same technique described but with "Mexican" commercial blue crabs of the same season taken commercially along the Gulf of Mexico coast. These measured an average of $7\frac{1}{2}$ to 8 inches across and were proportionally heavier, grade for grade. Cooking time was toward the upper end of the range noted. Results were the same, fresh blue crab taste, odor and texture being uniformly preserved by the invention over the two-month period.

Finally, as exemplified by the references cited, and as apparent to those familiar with such processes generally, it is extrapolatable that the uniformly good results obtained using the improvement of this invention will continue over indefinitely prolonged periods of storage because of absence of noticeable degradation over the test periods.

Bacteria plate counts of about 250 maximum have been found in whole crabs processed according to this invention in sharp contrast with picked crabmeat plate counts of several hundred times that much (100,000 or more in freeze preserved picked crabmeat). It is pointed out that bacteria plate counts of up to 250,000 are presently allowed.

Although illustrated for convenience as a batch process, this invention can be set up to run on a continuous conveyor line which dips into the baths for appropriate times between flat runs for loading and draining and delivers the crabs onto the packing table.

Some variations in the process set out here may be practiced, but will cause some degree of reduction of product quality. For example, the sugar in one of the cooking and chilling solutions may be omitted, but the end product is not as desirable in that the cooking solution apparently causes the meat to be permeated, and the use of sugar solution in the chill bath prevents the sugar from the cooking solution from being diluted. Further, as an optional step, at the second draining stage seasoning may be applied to the shell exteriors, and may be pre-frozen thereon, if desired, as by a liquid nitrogen jet. However, this is to a degree contrary to the quick, nearly simultaneous freezing of the whole crab taught by this invention in the preferred embodiment.

It is pointed out that the pre-chill sugar-water solution may have the equivalent "sugar content" by the use of sugar syrup, honey or similar substances rather than adding conventional sugar thereto.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a process for preserving whole blue crabs for later preparation and service as whole steamed crabs, including the sequential steps of cooking, quick cooling, quick freezing, packaging and storing, the improvement comprising preserving fresh whole crabmeat texture and taste through an extended shelf life by:
   (a) in at least one of said cooking and cooling steps, saturating the whole crab interiors with a solution consisting of water having sugar therein, sufficient for preserving the taste of the meat of the whole crabs, but substantially free of salt;
   (b) quick freezing the cooked and cooled whole crabs; and then
   (c) storing the solution-maintained quick frozen whole crabs at a temperature lower than $-15°$ F.

2. In a process as recited in claim 1, wherein the cooking step comprises boiling the whole crabs immersed in said solution.

3. In a process as recited in claim 2, wherein the quick cooling step comprises immersing the whole crabs in a cooled quantity of a second similar water and sugar solution.

4. In a process as recited in claim 3, wherein said solution comprises, in proportion, substantially one-eighth pint dry measure of sugar per gallon of water.

5. In a process as recited in claim 1, wherein the quick cooling step comprises immersing the whole crabs in a cooled quantity of said solution.

6. In a process as recited in claim 5, wherein said solution comprises, in proportion, substantially one-eighth pint dry measure of sugar, 50%, per gallon of water.

7. In a process as recited in claim 1, wherein the temperature during the storing is $-20°$ F. or below.

8. In a process for preserving whole blue crabs for later preparation and service as whole steamed crabs, including the sequential steps of cooking, quick cooling, quick freezing, packaging and storing, the improvement comprising preserving fresh whole crabmeat texture and taste through an extended shelf life by:
   (a) immersing the whole crabs in a cooling solution of heated water having sugar therein sufficient for preserving the taste of the meat of the whole crab, with the solution heated to approximately 212° F. and being at least substantially free of salt, the immersing step being carried out for a period of between 10 to 20 minutes;
   (b) withdrawing the crabs from the cooking solution and allowing the exterior surface cooking solution to drain from the crab;
   (c) immersing the drained and cooked crabs in a chilled bath to quickly lower the internal temperature of the crabs to 140° F. or less to terminate the cooking step;
   (d) quick draining exterior surface chilled bath from the chilled crabs;
   (e) immersing the crabs in a freezing bath at a temperature of below $-15°$ F.; and then
   (f) withdrawing the frozen crabs from the freezing bath.

9. In a process as recited in claim 8, wherein said chilled bath comprises a water and sugar solution of generally the same sugar content as said cooking solution.

* * * * *